US012804013B2

(12) United States Patent
Ketharaju et al.

(10) Patent No.: US 12,804,013 B2
(45) Date of Patent: Nov. 17, 2026

(54) SOFTWARE DEFINED NETWORK TRAPS FOR RANSOMWARE ATTACKS

(71) Applicant: Wells Fargo Bank, N.A., San Francisco, CA (US)

(72) Inventors: Rameshchandra Bhaskar Ketharaju, Hyderabad (IN); Anjeet Kumar, Bengaluru (IN); Suresh Reddy, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 8 days.

(21) Appl. No.: 18/898,202

(22) Filed: Sep. 26, 2024

(65) Prior Publication Data

US 2026/0089192 A1 Mar. 26, 2026

(51) Int. Cl.
*H04L 9/40* (2022.01)
*H04W 12/122* (2021.01)
*H04L 41/0813* (2022.01)

(52) U.S. Cl.
CPC ....... *H04L 63/1491* (2013.01); *H04W 12/122* (2021.01); *H04L 41/0813* (2013.01)

(58) Field of Classification Search
CPC ........... H04L 63/1491; H04L 41/0813; H04W 12/122
See application file for complete search history.

(56) References Cited

U.S. PATENT DOCUMENTS 7,734,895 B1 * 6/2010 Agarwal .................. G06F 8/52 712/15
8,122,509 B1 2/2012 Belov
9,807,115 B2 10/2017 Kolton et al.
10,496,836 B2 12/2019 Barak
10,637,884 B2 4/2020 Apple et al.
10,791,133 B2 9/2020 Shukla et al.
11,531,757 B2 12/2022 Karnik et al.
2015/0127805 A1 * 5/2015 Htay .................. H04L 43/0876 709/224
2020/0195679 A1 * 6/2020 Du ...................... H04L 63/1433

(Continued)

FOREIGN PATENT DOCUMENTS

CN 112422523 A 2/2021
CN 114268491 A 4/2022
CN 114726599 B 1/2023

OTHER PUBLICATIONS

Alotaibi, Fahad et al., “SDN-Based Detection of Self-Propagating Ransomware: The Case of BadRabbit,” Feb. 11, 2021, 21 pages.

(Continued)

*Primary Examiner* — Cheng-Feng Huang

(74) *Attorney, Agent, or Firm* — Merchant & Gould P.C.

(57) ABSTRACT

An example computer system for providing countermeasures for a ransomware attack can include: one or more processors; and non-transitory computer-readable storage media encoding instructions which, when executed by the one or more processors, causes the computer system to: recommend one or more countermeasures once the ransomware attack is identified; switch access for a client device from an application layer to a software defined network layer including a software defined network trap having nodes; and restrict access when the client device fails to perform a task at a node of the software defined network trap.

20 Claims, 5 Drawing Sheets

(56) References Cited

U.S. PATENT DOCUMENTS

| | | | | |
|---|---|---|---|---|
| 2020/0244704 | A1* | 7/2020 | Andrews | G06F 8/65 |
| 2022/0027472 | A1 | 1/2022 | Golden et al. | |
| 2023/0275917 | A1 | 8/2023 | Karmali et al. | |
| 2023/0418524 | A1 | 12/2023 | Darji et al. | |
| 2024/0179577 | A1* | 5/2024 | Porras | H04W 28/24 |
| 2025/0211976 | A1* | 6/2025 | Balakrishnan | H04W 12/04 |
| 2025/0310376 | A1* | 10/2025 | Strogov | H04L 63/1416 |
| 2025/0373659 | A1* | 12/2025 | Sahu | H04L 63/1416 |

OTHER PUBLICATIONS

Cusack, Greg et al., "Machine Learning-Based Detection of Ransomware Using SDN," Mar. 19-21, 2018, 6 pages.

* cited by examiner

SOFTWARE DEFINED NETWORK TRAPS FOR RANSOMWARE ATTACKS

BACKGROUND

A ransomware attack is an attack in which data and/or services are held hostage in exchange for compensation. Modern systems are capable of detecting such an attack to an extent; however, they provide only simplistic countermeasures for the same. Further, such systems fail to adapt to newer attack vectors or patterns over time.

SUMMARY

Examples provided herein are directed to software defined network traps for ransomware attacks.

According to one aspect, an example computer system for providing countermeasures for a ransomware attack can include: one or more processors; and non-transitory computer-readable storage media encoding instructions which, when executed by the one or more processors, causes the computer system to: recommend one or more countermeasures once the ransomware attack is identified; switch access for a client device from an application layer to a software defined network layer including a software defined network trap having nodes; and restrict access when the client device fails to perform a task at a node of the software defined network trap.

According to another aspect, an example method for providing countermeasures for a ransomware attack can include: recommending one or more countermeasures once the ransomware attack is identified; switching access for a client device from an application layer to a software defined network layer including a software defined network trap having nodes; and restricting access when the client device fails to perform a task at a node of the software defined network trap.

The details of one or more techniques are set forth in the accompanying drawings and the description below. Other features, objects, and advantages of these techniques will be apparent from the description, drawings, and claims.

DETAILED DESCRIPTION

This disclosure relates to countermeasures for ransomware attacks.

The examples provided herein address the problem of ransomware attacks by providing a collection of aspects that work together to manage access, monitor anomalies, and/or deploy countermeasures.

There can be various advantages associated with the technologies described herein. For instance, the countermeasures can be developed from real-life attack scenarios and simulate attacks to identify loopholes. This allows the technologies to be prepared for unseen scenarios. Embodiments can also provide more tailored countermeasure responses and/or automatically adapt countermeasures based on an attacker's depth of access, resulting in the practical application of a safer and more robust environment.

Figure 1:
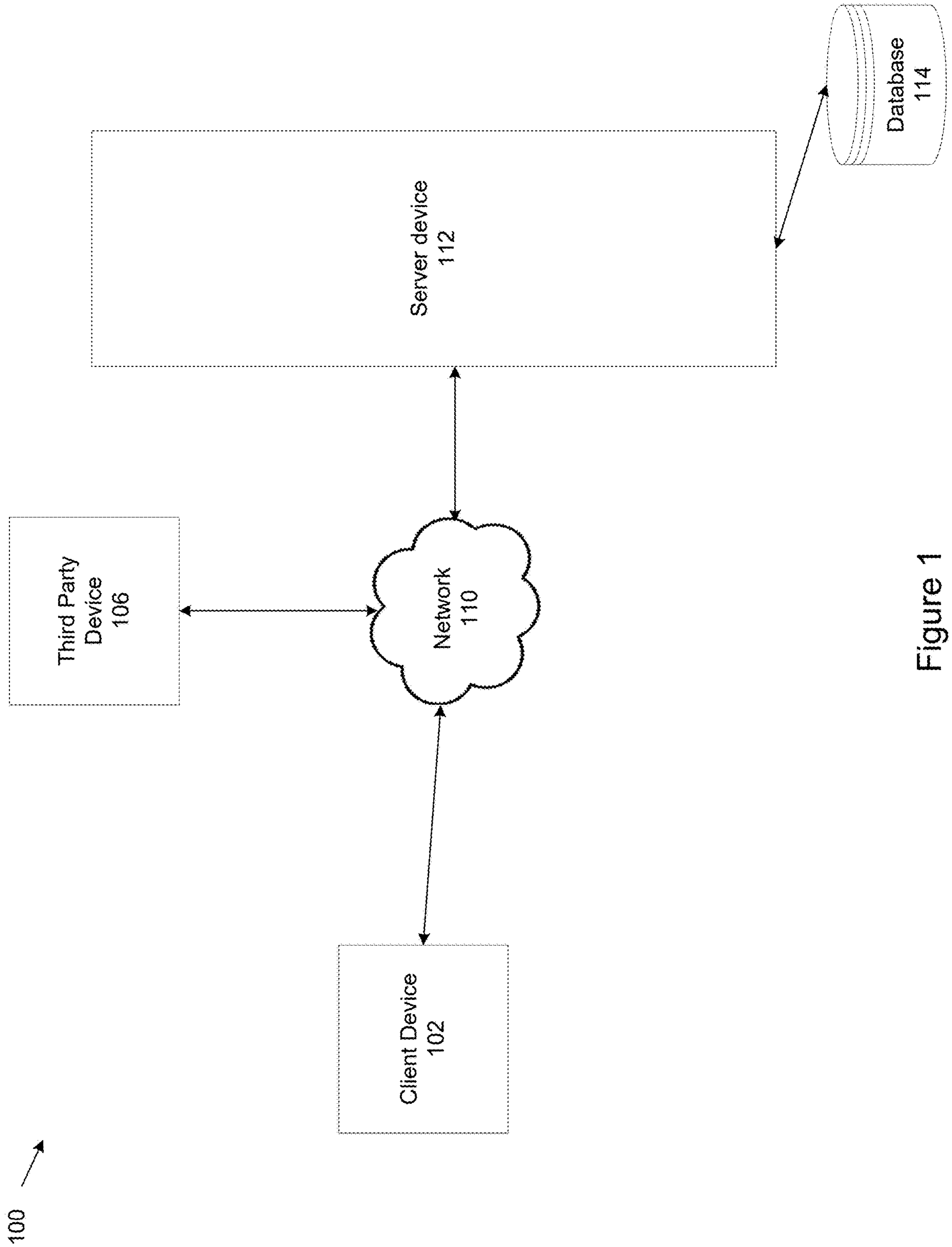
FIG. 1 shows an example system for providing countermeasures for ransomware attacks.

FIG. 1 schematically shows aspects of one example system 100 programmed to provide countermeasures for ransomware attacks. In this example, the system 100 can be a computing environment that includes a plurality of client and server devices. In this instance, the system 100 includes devices 102, 106, a server device 112, and a database 114. The devices 102, 106 can communicate with the server device 112 through a network 110 to accomplish the functionality described herein.

Each of the devices 102, 106, 112 may be implemented as one or more computing devices with at least one processor and memory. Example computing devices include a mobile computer, a desktop computer, a server computer, or other computing device or devices such as a server farm or cloud computing used to generate or receive data.

In some non-limiting examples, the server device 112 is owned by a financial institution, such as a bank. The devices 102, 106 can be programmed to communicate with the server device 112 to provide financial services, although many other types of services can also be provided. As part of providing these services, the system 100 can include countermeasures for ransomware attacks. Many other configurations are possible.

The example client device 102 is programmed to communicate with the server device 112 to request data and/or services. For instance, the client device 102 can be controlled by a customer to request information associated with an account stored on the server device 112, such as a financial services account (e.g., checking or savings accounts, credit card account, etc.).

The example third party device 106 is also programmed to communicate with the server device 112 to request data and/or services. For instance, the third party device 106 can be a third-party financial institution that exchanges information with the server device 112, such as conducting financial transactions (e.g., account transfers, credit card transactions, etc.)

The example server device 112 is programmed to provide data and/or services to various clients, such as the devices 102, 106. For instance, the server device 112 can be controlled by the financial institution to provide financial services to the devices 102, 106, as described above.

The example database 114 is programmed to store data associated with the financial institution. In one example, the database 114 stores data associated with customer accounts that are serviced by the server device 112. The server device 112 can query the database 114 to obtain information associated with financial accounts and transactions.

The network 110 provides a wired and/or wireless connection between the devices 102, 106 and the server device 112. In some examples, the network 110 can be a local area network, a wide area network, the Internet, or a mixture thereof. Many different communication protocols can be used. Although only three devices are shown, the system 100 can accommodate hundreds, thousands, or more of computing devices.

Figure 2:
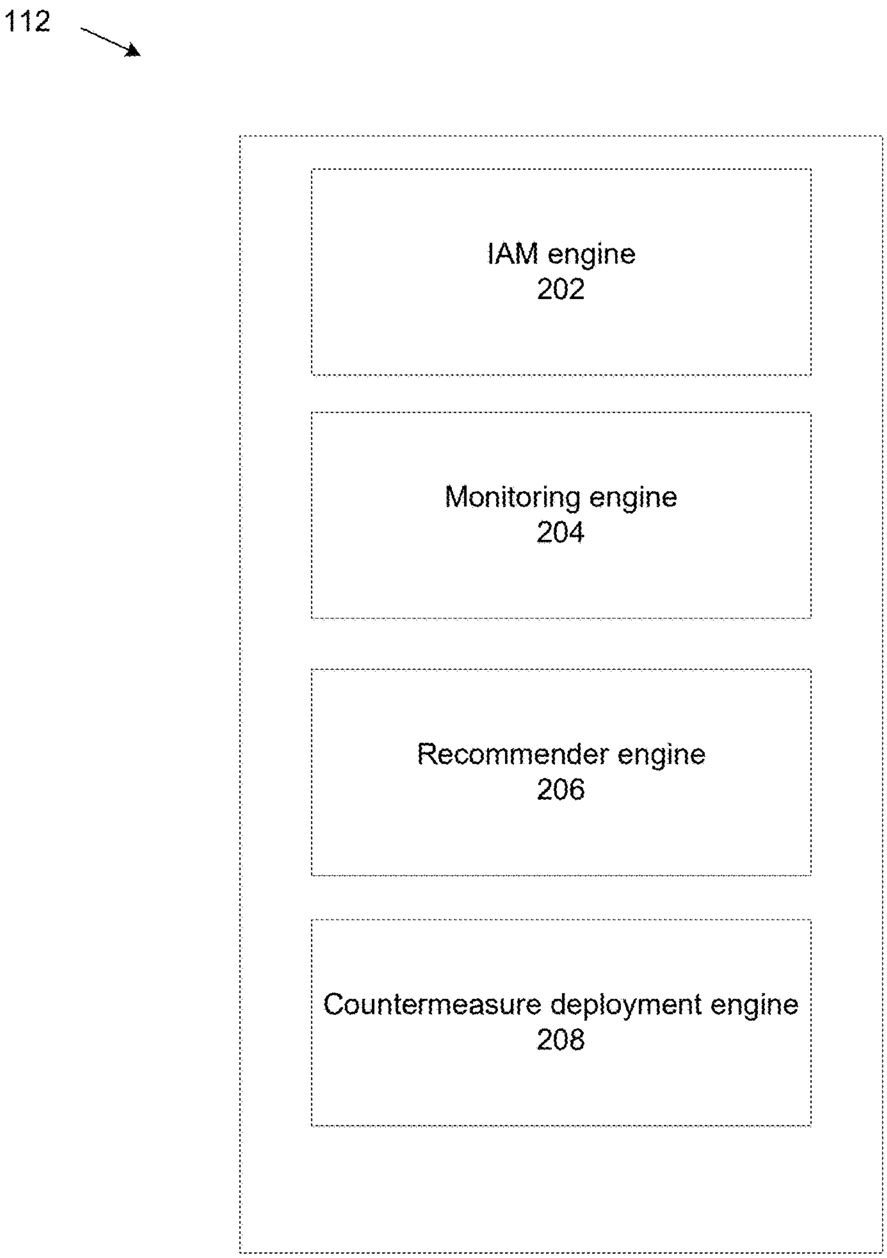
FIG. 2 shows example logical components of a server device of the system of FIG. 1.

Referring now to FIG. 2, additional details of the server device 112 are shown. In this example, the server device 112 has various logical engines that assist in providing countermeasures for ransomware attacks. The server device 112 can, in this instance, include an Identity and Access Management (IAM) engine 202, a monitoring engine 204, a recommender engine 206, and a countermeasure deployment engine 208. In other examples, more or fewer engines providing different functionality can be used.

The IAM engine 202 is programmed to manage user identities and access to monitored data for the system 100. The IAM engine 202 authenticates users based on access tokens and keys and implements a multilevel access system. If a user's profile does not match the resource access, the data is sent to the monitoring engine 204 for further action.

The example monitoring engine 204 provides real-time monitoring of the IAM engine 202, generating alerts for access requests and grants. It can use a Generative Adversarial Network for anomaly detection, learning and improving over time. Data is collected from real-life scenarios and a Sequential Simulation Generator for simulating attacks, creating a robust anomaly detection system.

The example recommender engine 206 uses generative artificial intelligence (GenAI) that analyzes anomaly profiles from generated alerts and prepares countermeasures. Based on factors, such as the number of layers bypassed and roles accessed, appropriate actions are recommended by the recommender engine 206. Countermeasures can be deployed at different levels of access as required based upon input from the recommender engine 206.

For instance, the recommender engine 206 can be trained from a corpus of previous attack data and/or simulated attack data to understand ransomware attacks. The recommender engine 206 can thereupon use GenAI to understand a current attack as information is provided by the monitoring engine 204. Based upon this information, the recommender engine 206 uses GenAI to tailor countermeasures as appropriate to address the ransomware attack, as provided in more detail below.

The example countermeasure deployment engine 208 is responsible for deploying tailored countermeasures based upon recommendations from the recommender engine 206. Various countermeasures can be used.

For instance, in examples provided herein, the countermeasure deployment engine 208 generates a software defined network (SDN) trap, leading attackers to a false clone system to enhance security. This technology can detect and flag ransomware attacks, divert attackers to false ends, learn attack patterns to improve access key protocols, and simulate attacks for internal response training. Additional details of the SDN trap are provided below.

In other examples, the countermeasure deployment engine 208 can generate other types of countermeasures in addition to or in place of the SDN trap. For instance, the countermeasure deployment engine 208 can also be programmed to generate a Key-Length Discriminator, which manipulates access keys within the IAM engine 202 to enhance security during a ransomware attack. Examples of such countermeasures can be found in application Ser. No. 18/898,163, filed on even day herewith, which is hereby incorporated by reference in its entirety.

Figure 3:
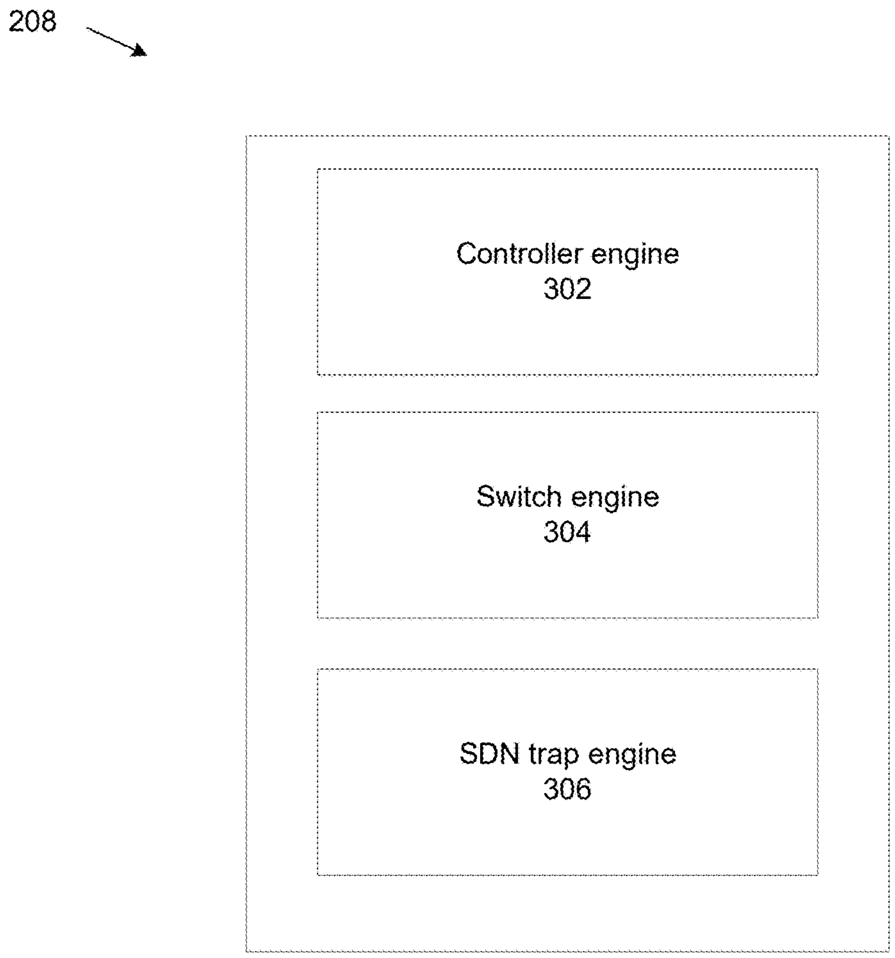
FIG. 3 shows additional details of a countermeasure engine of the server device of FIG. 2.

FIG. 3 shows additional details of the countermeasure deployment engine 208 of the server device 112. Generally, the countermeasure deployment engine 208 is programmed to counter potential ransomware attacks once an alert is triggered by the monitoring engine 204. The countermeasure deployment engine 208 can generate the SDN trap, which is designed to pinpoint the intruder without taking down resources on the server device 112 for legitimate users.

The benefits of the SDN trap generated by the countermeasure deployment engine 208 lies in the ability to detect and counter intruders while maintaining connectivity for legitimate users. The use of dummy nodes in the SDN trap makes it difficult for attackers to differentiate between actual application nodes and the trap nodes, as described further below. Additionally, the tasks that are required to be performed at each node are unknown to the attacker, further complicating the attacker's attempts to access the application and increasing the security of the system.

Further, the recommended countermeasures, which can be generated by the recommender engine 206 using GenAI, are hard to predict, adding an additional layer of security to the system. Overall, the countermeasure deployment engine 208 provides a robust defense against ransomware attacks by effectively detecting and flagging intruders without disrupting the availability of application servers and data to legitimate users.

More specifically, in this example, the countermeasure deployment engine 208 of FIG. 3 has various logical engines that assist in deploying the countermeasures. In this instance, the countermeasure deployment engine 208 includes a controller engine 302, a switch engine 304, and an SDN trap engine 306. In other examples, more or fewer engines providing different functionality can be used.

The example controller engine 302 of the countermeasure deployment engine 208 is programmed to receive recommendations from the recommender engine 206 and accordingly reroute switches from an application layer to an SDN layer by controlling the switch engine 304. Specifically, the controller engine 302 triggers the SDN layer when the alert from the recommender engine 206 indicates to do so. See, e.g., FIG. 4. At this point, the controller engine 302 updates each legitimate group policy with the instructions for circumventing the SDN trap, as described below. Any attacker is unaware of this update of the group policy.

The group policy includes a set of instructions for each client device, including the client device 102 and the third party device 106, to access the system 100. Legitimate client devices have access to the updated group policy, while nefarious actors looking to implement ransomware do not, as provided below.

Further, the controller engine 302 monitors the SDN trap, when deployed by the SDN trap engine 306, for any signals from the SDN trap for users that did not pass the instruction validation.

The switch engine 304 is programmed to switch the context between the application layer and the SDN layer as directed by the controller engine 302. This allows for seamless connectivity for legitimate users while the trap layer is active.

More specifically, the client device 102 normally uses the network 110 to access resources on the application layer of the server device 112. When the switch engine 304 changes access, the client device 102 instead is caused to access the SDN layer, as described further below, to identify which, if any, client devices are bad actors.

The SDN trap engine 306 is programmed to take input from the controller engine 302 and generate the SDN trap as a loop of a virtual loop of dummy nodes, sometimes referred to as "Chakravyūha/Padmavyūha". The SDN trap engine 306 can define a certain sequence or order for the nodes that must be traversed. Further, each node can include a task to be performed. These could be of various types (e.g., reading, writing, copying, or pasting). For example, such tasks can be writing a certain key or reading data from a node 1, and writing it to a node 2, as provided in more detail below.

In essence, at each node, forwarding of packets occurs, along with segmentation and reassembly of the data. All these instructions are directed by the SDN trap engine 306 and can be modified over time. For instance, the tasks to be performed at each node can be randomly generated by the recommender engine 206 using GenAI and changed at periodic intervals or at each alert. In another example, the recommender engine 206 is configured to tailor the tasks to specifics associated with the possible ransomware attack. For instance, if a particular exploit is thought to have been used, the GenAI can generate certain tasks that are specific to that exploit to find bad actors.

The SDN trap engine 306 sets up the SDN trap based as a loop of nodes. Any user trying to access the resource has to perform the necessary new instructions as per the dynamic group policy as they traverse through the network. The controller engine 302 determines the number of application servers required for using a new group policy dynamically. A trap layer is monitored by the controller engine 302 for any signals indicating that users have not followed the instruction validation.

If any access attempt is found which does not follow the order of the nodes and/or the tasks for some defined number of nodes, the user details are flagged.

Figure 4:
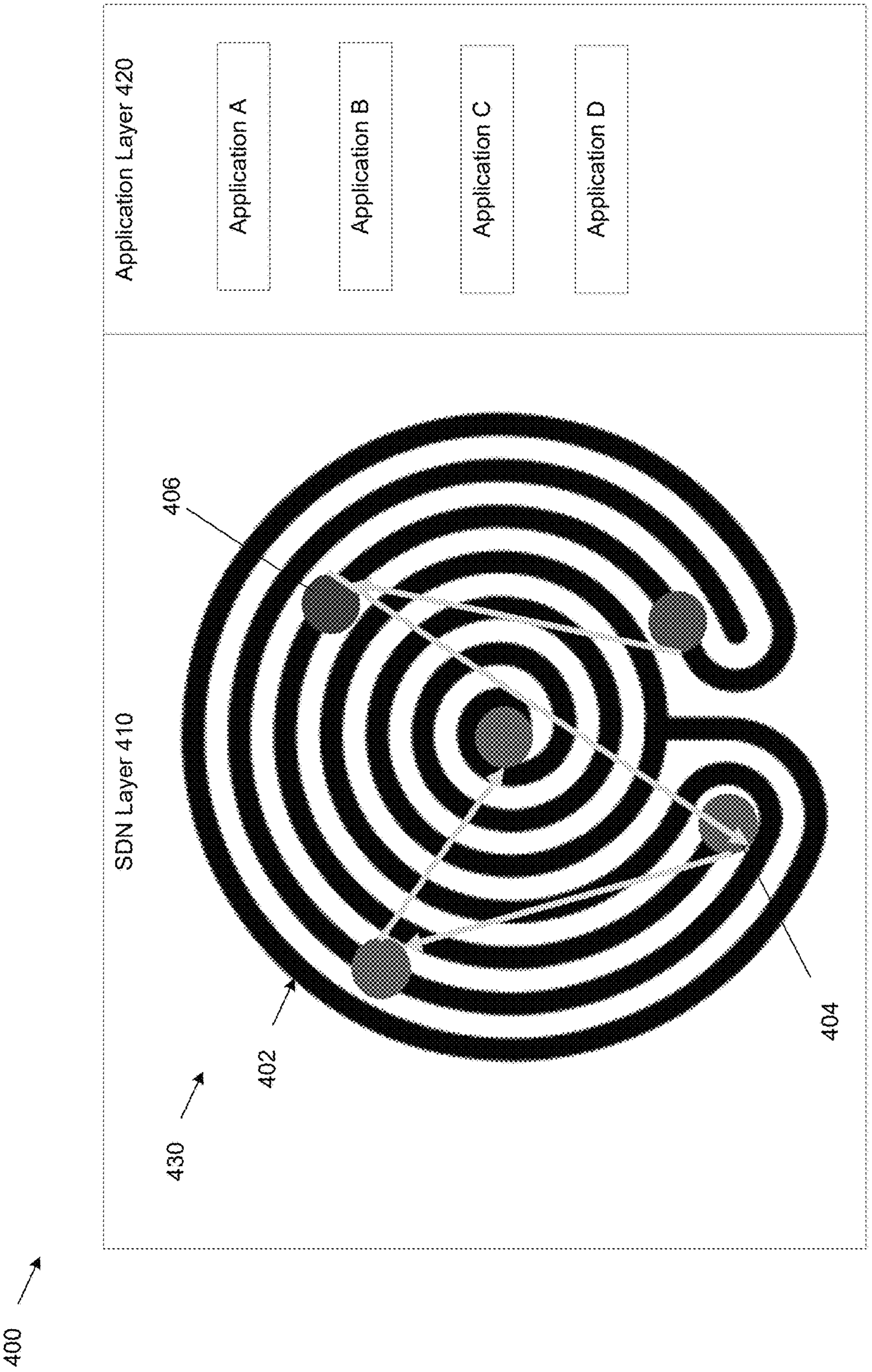
FIG. 4 shows example resource layers provided by the server device of FIG. 2.

For instance, referring now to FIG. 4, an example graphical depiction 400 of resources provided by the server device 112 is shown. In this example, the resources include an application layer 420 that provides normal applications for the client device 102, such as Applications A-D.

The graphical depiction 400 also includes an SDN layer 410 having an SDN trap 430 that includes a virtual loop 402 of nodes 404, 406. As the client device 102 traverses each of the nodes 404, 406, the client device 102 must perform a specific task. For instance, at the node 404, the client device 102 is required to paste a certain value. At node 406, the client device 104 is required to read certain values. Based upon the updated group policy, the client device 102 has the information needed to perform each task at each node. Further, some nodes in the SDN trap 430 can be dummy nodes that are skipped by legitimate client devices but may be accessed and tasks performed by intruder devices.

The SDN trap engine 306 monitors the client device 102 as the client device 102 traverses the nodes 404, 406. In this example, the client device 102 fails to read the correct values at the node 406. Given this failure, the controller engine 302 flags the client device 102 as a possible intruder. The server device 112 can thereupon limit access for the client device 102 to minimize possible ransomware attacks. Conversely, when the client device 102 correctly traverses the SDN trap 430, the switch engine 304 thereupon provides access back to the application layer 420. Many other configurations are possible.

Figure 5:
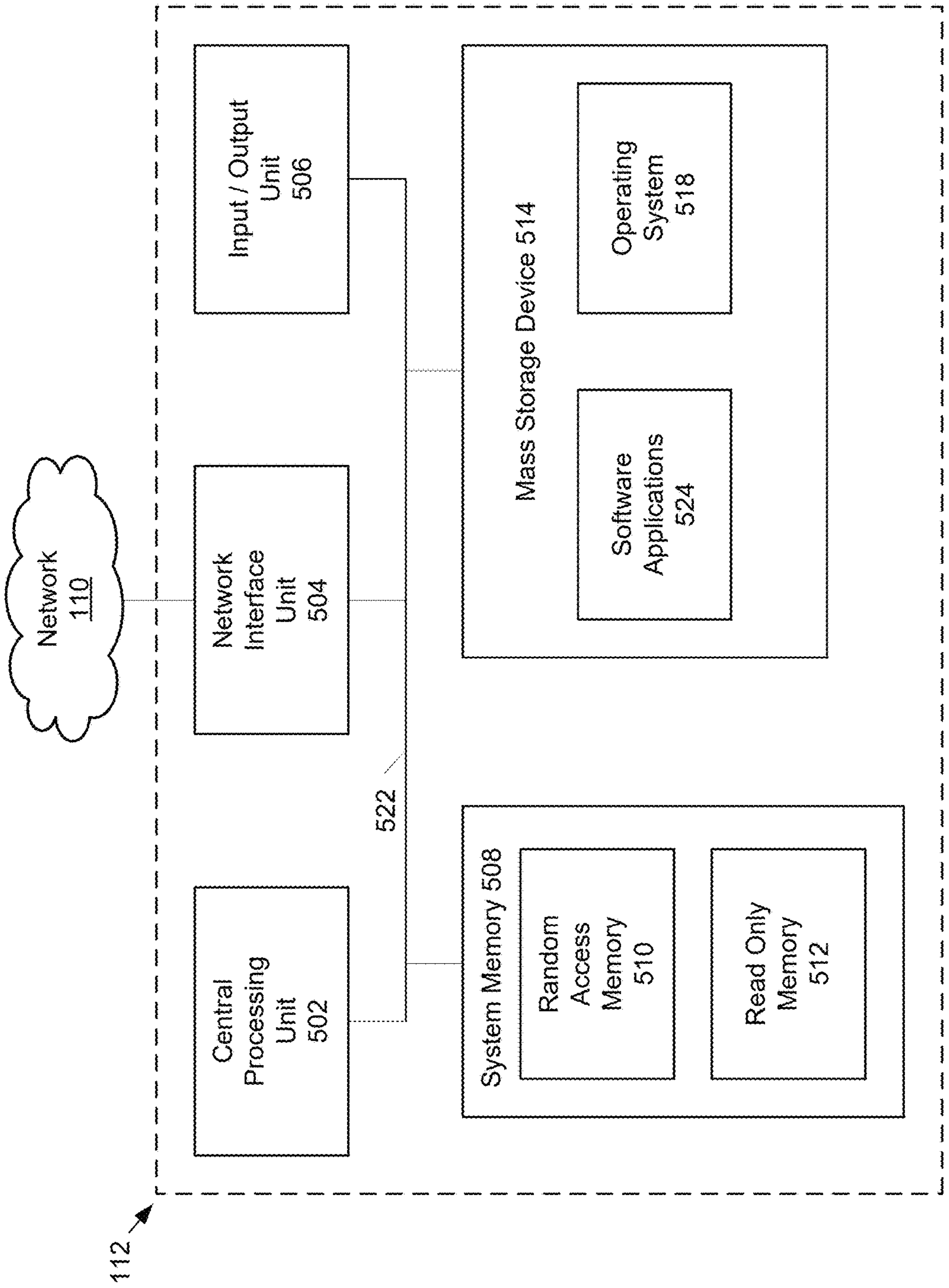
FIG. 5 shows example physical components of the server device of FIG. 2.

As illustrated in the embodiment of FIG. 5, the example server device 112, which provides some of the functionality described herein, can include at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system containing the basic routines that help transfer information between elements within the server device 112, such as during startup, is stored in the ROM 512. The server device 112 further includes a mass storage device 514. The mass storage device 514 can store software instructions and data. A central processing unit, system memory, and mass storage device similar to that shown can also be included in the other computing devices disclosed herein.

The mass storage device 514 is connected to the CPU 502 through a mass storage controller (not shown) connected to the system bus 522. The mass storage device 514 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 504 connected to the system bus 522. It should be appreciated that the network interface unit 504 may also be utilized to connect to other types of networks and remote computing systems. The server device 112 also includes an input/output controller 506 for receiving and processing input from a number of other devices, including a touch user interface display screen or another type of input device. Similarly, the input/output controller 506 may provide output to a touch user interface display screen or other output devices.

As mentioned briefly above, the mass storage device 514 and the RAM 510 of the server device 112 can store software instructions and data. The software instructions include an operating system 518 suitable for controlling the operation of the server device 112. The mass storage device 514 and/or the RAM 510 also store software instructions and applications 524, that when executed by the CPU 502, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for providing countermeasures for a ransomware attack, comprising:
 one or more processors; and
 non-transitory computer-readable storage media encoding instructions which, when executed by the one or more processors, cause the computer system to:
  recommend one or more countermeasures once the ransomware attack is identified;
  switch access for a client device from an application layer that provides access to one or more applications to a dynamically-generated software defined network layer, generated in response to the ransomware attack, for validating the client device, the software defined network layer including a software defined network trap having nodes arranged as a virtual loop; and restrict access when the client device fails to perform a task at a node of the software defined network trap.

2. The computer system of claim 1, comprising further instructions which, when executed by the one or more processors, cause the computer system to recommend the software defined network trap as one of the countermeasures.

3. The computer system of claim 1, comprising further instructions which, when executed by the one or more processors, cause the computer system to use generative artificial intelligence to select tasks to be performed at the node of the software defined network trap.

4. The computer system of claim 3, wherein the tasks are selected, at least in part, based upon a type of the ransomware attack.

5. The computer system of claim 1, wherein the task includes reading, writing, copying, and pasting information.

6. The computer system of claim 1, wherein the nodes include at least one dummy node.

7. The computer system of claim 1, comprising further instructions which, when executed by the one or more processors, cause the computer system to provide access back to the application layer when the client device performs the task at the node of the software defined network trap.

8. The computer system of claim 1, comprising further instructions which, when executed by the one or more processors, cause the computer system to issue an updated group policy once the ransomware attack is identified, the updated group policy including information associated with the software defined network trap.

9. The computer system of claim 8, wherein the updated group policy includes the task at the node.

10. The computer system of claim 1, comprising further instructions which, when executed by the one or more processors, cause the computer system to require the client device to traverse the nodes in the software defined network trap in a certain order.

11. A method for providing countermeasures for a ransomware attack, comprising:

recommending one or more countermeasures once the ransomware attack is identified;

switching access for a client device from an application layer that provides access to one or more applications to a dynamically-generated software defined network layer, generated in response to the ransomware attack, for validating the client device, the software defined network layer including a software defined network trap having nodes arranged as a virtual loop; and restricting access when the client device fails to perform a task at a node of the software defined network trap.

12. The method of claim 11, further comprising recommending the software defined network trap as one of the countermeasures.

13. The method of claim 11, further comprising using generative artificial intelligence to select tasks to be performed at the node of the software defined network trap.

14. The method of claim 13, wherein the tasks are selected, at least in part, based upon a type of the ransomware attack.

15. The method of claim 11, wherein the task includes reading, writing, copying, and pasting information.

16. The method of claim 11, wherein the nodes include at least one dummy node.

17. The method of claim 11, further comprising providing access back to the application layer when the client device performs the task at the node of the software defined network trap.

18. The method of claim 11, further comprising issuing an updated group policy once the ransomware attack is identified, the updated group policy including information associated with the software defined network trap.

19. The method of claim 18, wherein the updated group policy includes the task at the node.

20. The method of claim 11, further comprising requiring the client device to traverse the nodes in the software defined network trap in a certain order.

* * * * *